(12) United States Patent
Naruse

(10) Patent No.: US 9,486,970 B2
(45) Date of Patent: Nov. 8, 2016

(54) TIRE PUNCTURE SEALING AGENT

(75) Inventor: Masahiro Naruse, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/239,359

(22) PCT Filed: Aug. 8, 2012

(86) PCT No.: PCT/JP2012/070157
§ 371 (c)(1),
(2), (4) Date: Feb. 18, 2014

(87) PCT Pub. No.: WO2013/024759
PCT Pub. Date: Feb. 21, 2013

(65) Prior Publication Data
US 2014/0221527 A1    Aug. 7, 2014

(30) Foreign Application Priority Data
Aug. 18, 2011 (JP) .................................. 2011-179055

(51) Int. Cl.
| | |
|---|---|
| B29C 73/00 | (2006.01) |
| C08L 7/02 | (2006.01) |
| C08L 31/04 | (2006.01) |
| B29C 73/16 | (2006.01) |
| C08L 23/08 | (2006.01) |
| C08K 5/053 | (2006.01) |

(Continued)

(52) U.S. Cl.
CPC .............. *B29C 73/163* (2013.01); *B29C 73/00* (2013.01); *B29K 2007/00* (2013.01); *C08K 5/053* (2013.01); *C08L 7/02* (2013.01); *C08L 23/0853* (2013.01); *C08L 31/04* (2013.01); *C09K 3/10* (2013.01)

(58) Field of Classification Search
CPC ....... B29C 73/00; B29C 73/02; B29C 73/16; C08L 7/02; C08L 23/0853; C08L 31/04
USPC ........................................................ 523/166
See application file for complete search history.

(56) References Cited

U.S. PATENT DOCUMENTS

| | | | |
|---|---|---|---|
| 8,148,448 B2 * | 4/2012 | Takahara et al. ............. 523/166 |
| 8,470,909 B2 * | 6/2013 | Takahara et al. ............. 523/166 |
| 2003/0050365 A1 | 3/2003 | Kishida et al. | |

(Continued)

FOREIGN PATENT DOCUMENTS

| | | |
|---|---|---|
| DE | 60211436 T2 | 12/2006 |
| DE | 60318648 T2 | 1/2009 |

(Continued)

OTHER PUBLICATIONS

Office Action dated Oct. 8, 2015 to corresponding German Patent Application No. 112012003424.4 with partial English translation.

*Primary Examiner* — Rip A Lee
(74) *Attorney, Agent, or Firm* — Carrier Blackman & Associates, P.C.; Joseph P. Carrier; William D. Blackman

(57) ABSTRACT

The present invention provides a tire puncture sealant containing a natural rubber latex and/or a synthetic resin emulsion and propylene glycol, the propylene glycol/water ratio being from 0.5 to 1.1, and the viscosity at −20° C. when a BL-type viscometer is used being from 100 to 1200 mPa·s at a revolution speed of 60 rpm. The tire puncture sealant of the present invention has excellent low-temperature injection properties and sealing performance.

7 Claims, 3 Drawing Sheets

(51) Int. Cl.
*C09K 3/10* (2006.01)
*B29K 7/00* (2006.01)

(56) References Cited

U.S. PATENT DOCUMENTS

| | | | |
|---|---|---|---|
| 2004/0010059 A1 | 1/2004 | Kojima et al. | |
| 2009/0023837 A1 | 1/2009 | Okamatsu et al. | |
| 2010/0331449 A1* | 12/2010 | Ishida et al. | 523/166 |
| 2011/0201722 A1 | 8/2011 | Takahara et al. | |
| 2012/0309867 A1* | 12/2012 | Takahara | 523/166 |

FOREIGN PATENT DOCUMENTS

| | | | | |
|---|---|---|---|---|
| DE | 102008033514 A1 | | 2/2009 | |
| JP | 2003-082328 A | | 3/2003 | |
| JP | 2009-051893 | * | 3/2009 | C09K 3/10 |
| JP | 2010-43155 A | * | 2/2010 | C09K 3/10 |
| JP | 2011-006645 | * | 1/2011 | C09K 3/10 |
| JP | 2011-006645 A | | 1/2011 | |
| JP | 2011-012130 A | | 1/2011 | |
| JP | 2011-012160 A | | 1/2011 | |
| JP | 2011-026544 A | | 2/2011 | |
| WO | 2011/096491 A1 | | 8/2011 | |
| WO | WO 2011/096491 A1 | * | 8/2011 | C09K 3/10 |

* cited by examiner

Relationship between the viscosity in a PG aqueous solution and the PG/water ratio (-20°C)

Relationship between the viscosity in a PG aqueous solution and the PG/water ratio (-40°C)

TIRE PUNCTURE SEALING AGENT

TECHNICAL FIELD

The present invention relates to a tire puncture sealant.

BACKGROUND OF THE INVENTION

A tire puncture sealant is obtained by blending an antifreezing agent such as propylene glycol with NR latex and/or a synthetic resin emulsion. Conventionally, in order to improve the injection properties of a tire puncture sealant by reducing the viscosity at low temperatures, a method of diluting the NR latex or synthetic resin emulsion by adding water to the tire puncture sealant and the method described in Patent Document 1 have been proposed.

PRIOR ART DOCUMENTS

Patent Documents

Patent Document 1: Japanese Unexamined Patent Application Publication No. 2011-12130

SUMMARY OF THE INVENTION

Problems to be Solved by the Invention

However, in the method of diluting the solution by adding water, although the viscosity of the tire puncture sealant at low temperatures is reduced, the sealing performance is diminished, and it is difficult to achieve both low-temperature injection properties and sealing performance of the tire puncture sealant.

In addition, the present inventors discovered that there is room for improvement with regard to the injection properties in low-temperature environments of tire puncture sealants containing large amounts of propylene glycol, such as that described in Patent Document 1.

Therefore, an object of the present invention is to provide a tire puncture sealant having excellent low-temperature injection properties and sealing performance.

Here, the present inventors focused attention on the relationship between water and propylene glycol (PG) contained in the tire puncture sealant. This will be described hereinafter with reference to the attached drawings. FIG. 1 is a graph showing the relationship between the viscosity of the tire puncture sealant and the PG/water ratio. The data used in FIG. 1 are the results of producing a tire puncture sealant having a solid content of 25.99 mass % and a PG/water ratio from 0.3 to 2.3 by adding PG to natural rubber latex, leaving the tire puncture sealant to stand under conditions at normal temperature (20° C.), −20° C., and −40° C., and measuring the viscosity of the tire puncture sealant using a BL-type viscometer (revolution speed: 60 rpm, rotor No. 3). In the graphs of FIG. 1 for −20° C. and −40° C., a phenomenon can be observed in which the viscosity decreases in the vicinity of a PG/water ratio of 1.7 and is the same or decreases at a PG/water ratio of 1.8 or higher. PG was conventionally added to the tire puncture sealant in a larger amount than water for the purpose of preventing freezing, but adding a large amount of PG may have also inhibited increases in the viscosity of the tire puncture sealant at low temperatures while preventing freezing.

In addition, in FIG. 1, the present inventors discovered that the viscosity of the tire puncture sealant increases dramatically at a PG/water ratio exceeding 1.1 and up to around 1.5 under conditions at −20° C. and that the injection properties of the tire puncture sealant at low temperatures are dramatically diminished as a result. The present inventors also discovered that at a PG/water ratio from 0.3 to 1.1, low-temperature injection properties are excellent while the viscosity of the tire puncture sealant is maintained at a low level.

FIG. 3 is a graph showing the results of measuring the viscosities of tire puncture sealants with PG/water ratios of 0.8, 1.2, and 1.5 under conditions at normal temperature (20° C.), −20° C., and −40° C. The tire puncture sealants used in the measurements of the results shown in FIG. 3 are the same as the tire puncture sealants having PG/water ratios of 0.8, 1.2, and 1.5 used when measuring the data shown in FIG. 1. The viscosity was measured with the same method as described above. In FIG. 3, the viscosity is lowest when the PG/water ratio is 0.8 under each of the conditions at normal temperature (20° C.), −20° C., and −40° C.

The present inventors speculate as follows regarding the mechanism of the phenomenon in which the viscosity of the tire puncture sealant decreases in the vicinity of a PG/water ratio of 1.7.

Alcohols such as PG may form clusters in an aqueous solution when mixed with water. A cage-like (clathrate) structure is formed as water molecules form hydrogen bonds around the alcohol molecules gathered due to hydrophobic interactions. This is called "hydrophobic hydration". When the alcohol concentration increases (to the extent that is ordinarily used in a tire puncture sealant), the clusters assemble with one another and the cage-like structure based on a hydrogen bond network of water molecules collapses, which causes the viscosity to drop. In the case of a mixed PG/water system, the PG/water ratio at which the clusters assemble with one another and the cage-like structure based on a hydrogen bond network of water molecules collapses is considered to be in the vicinity of 1.7. That is, it is thought that a PG/water ratio in the vicinity of 1.7 may be the border line at which the cage-like structure based on a hydrogen bond network of water molecules collapses, making the system unstable and causing the clusters to start to assemble. When the PG/water ratio exceeds 1.7, it becomes easy for the clusters to assemble, which may account for the tendency for the viscosity to not increase or to decrease.

Next, the present inventors investigated the relationship between the viscosity in an aqueous solution and the PG/water ratio. The results are shown in FIGS. 2A-2B. FIGS. 2A-2B are graphs showing the relationship between the viscosity in a PG aqueous solution and the PG/water ratio. The data used in FIGS. 2A-2B are the results of measuring the viscosity at −20° C. and −40°, respectively, in the same manner as described above for a PG aqueous solution obtained by mixing propylene glycol and water at a PG/water ratio from 0.9 to 2.3. In FIGS. 2A and 2B, it can be observed that the viscosity decreases at a PG/water ratio in the vicinity of 1.7. This is the same trend as in the results of the tire puncture sealants of FIG. 1 (−20° C. and −40° C.). In addition, in FIGS. 2A and 2B, a phenomenon was observed in which the viscosity of the PG aqueous solution dramatically increased at a PG/water ratio exceeding 1.1 and up to around 1.6.

The present inventors speculate as follows regarding the mechanism of the phenomenon in which the viscosity of the PG aqueous solution dramatically increases at a PG/water ratio exceeding 1.1 and up to around 1.6.

As described above, alcohols such as PG may form clusters in an aqueous solution when mixed with water. A cage-like (clathrate) structure is formed as water molecules form hydrogen bonds around the alcohol molecules gathered due to hydrophobic interactions. Until cluster assembly occurs (that is, in a range less than the vicinity of 1.7— exceeding 1.1 and in the vicinity of 1.6—in a PG/water system), it is considered that the viscosity increases due to the formation of a clathrate structure.

Means to Solve the Problem

As a result of conducting dedicated research in order to solve the problems described above, the present inventors discovered that the low-temperature injection properties and sealing performance of a tire puncture sealant are excellent when the propylene glycol/water ratio is from 0.5 to 1.1 and the viscosity is from 100 to 1200 mPa·s, the present inventors thereby completed the present invention.

Specifically, the present invention provides the following 1 to 4.

1. A tire puncture sealant containing a natural rubber latex and/or a synthetic resin emulsion and propylene glycol, the propylene glycol/water ratio being from 0.5 to 1.1, and the viscosity at −20° C. when a BL-type viscometer is used being from 100 to 1200 mPa·s at a revolution speed of 60 rpm.

2. The tire puncture sealant according to 1 described above, wherein the solid content of the natural rubber latex and/or the synthetic resin emulsion is from 20 to 40% (mass %).

3. The tire puncture sealant according to 1 or 2 described above containing the natural rubber latex and the synthetic resin emulsion, wherein the ratio of the solid content of the natural rubber latex to the solid content of the synthetic resin emulsion is from 90/10 to 30/70.

4. The tire puncture sealant according to any one of 1 to 3 described above, wherein the synthetic resin contained in the synthetic resin emulsion contains at least one type selected from the group consisting of ethylene-vinyl acetate copolymer resins, (meth)acrylic resins, and ethylene-vinyl acetate-vinyl versatate copolymer resins.

Effects of the Invention

The tire puncture sealant of the present invention has excellent low-temperature injection properties and sealing performance.

BEST MODE FOR CARRYING OUT THE INVENTION

Figure 1:
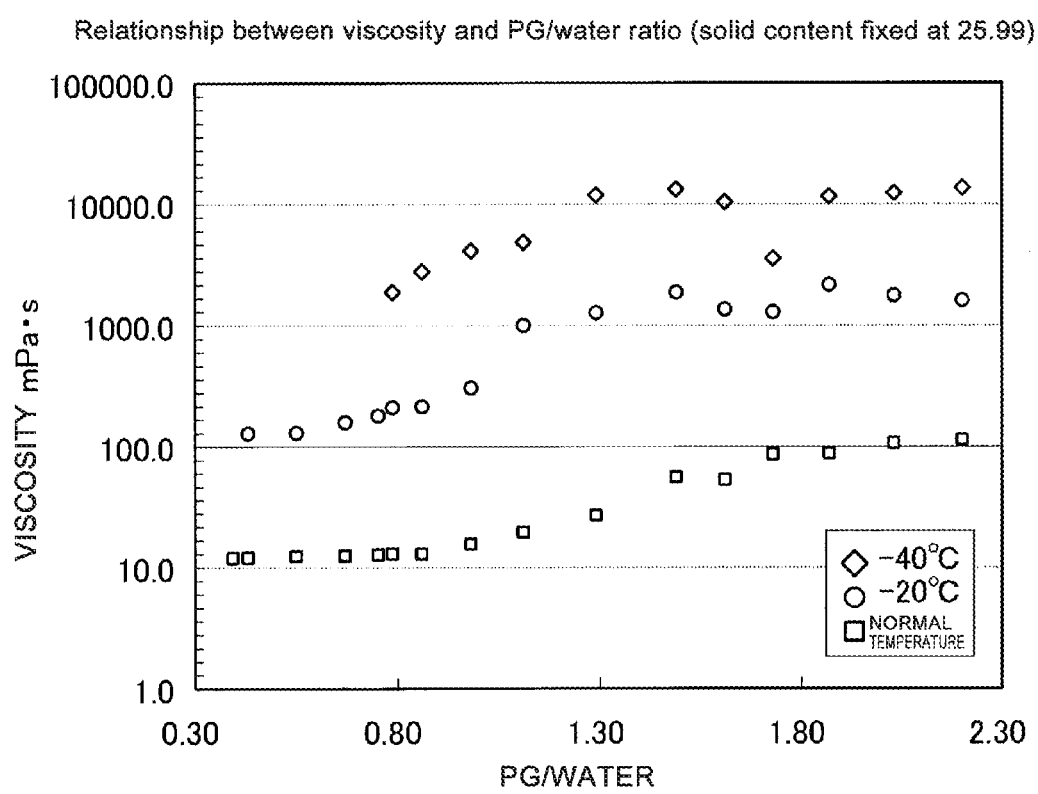
FIG. 1 is a graph showing the relationship between the viscosity of the tire puncture sealant and the PG/water ratio.
Figure 2A:
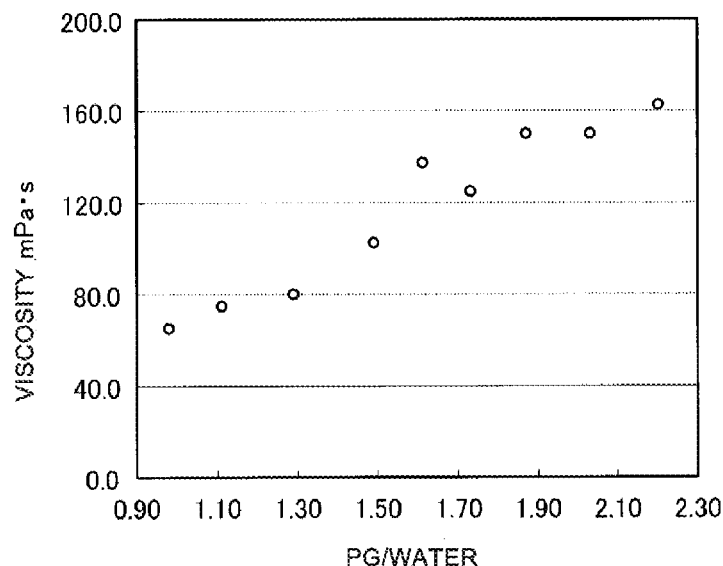
FIGS. 2A-2B are graphs showing the relationship between the viscosity in a PG aqueous solution and the PG/water ratio.
Figure 2B:
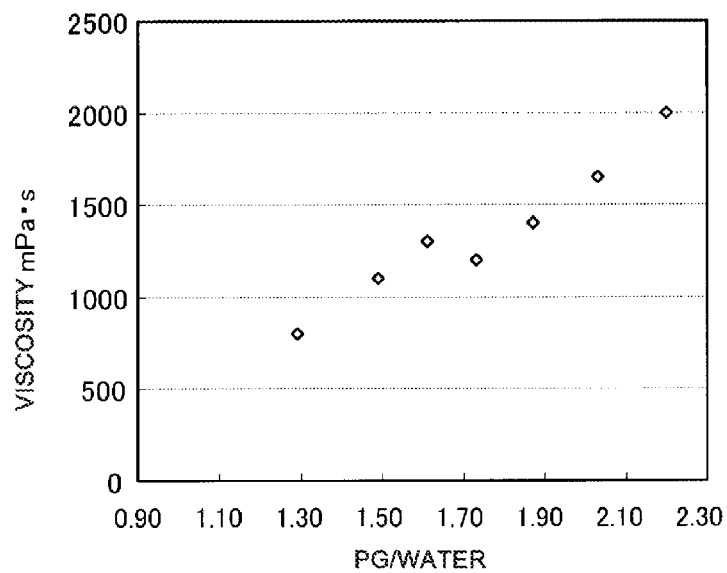
Figure 3:
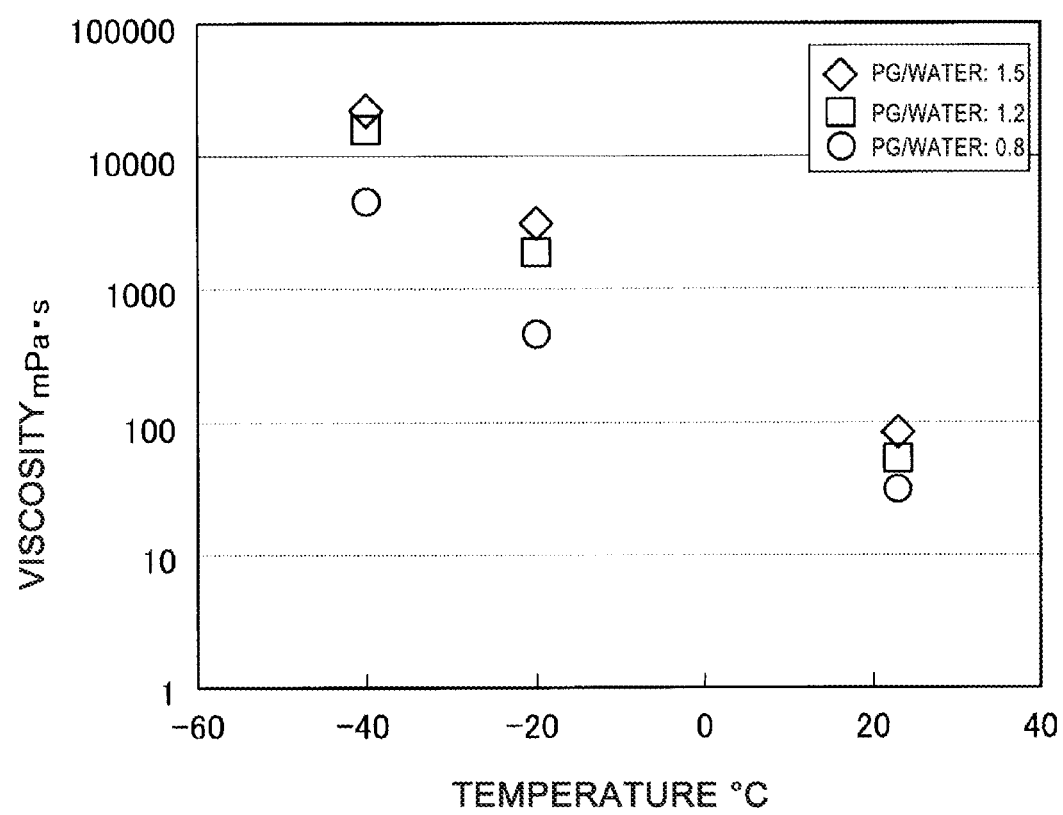
FIG. 3 is a graph showing the results of measuring the viscosities of tire puncture sealants with PG/water ratios of 0.8, 1.2, and 1.5 under conditions at normal temperature (20° C.), −20° C., and −40° C.

The present invention is described in detail below.

The present invention is a tire puncture sealant containing a natural rubber latex and/or a synthetic resin emulsion and propylene glycol, the propylene glycol (PG)/water ratio being from 0.5 to 1.1, and the viscosity at −20° C. when a BL-type viscometer is used being from 100 to 1200 mPa·s at a revolution speed of 60 rpm.

The tire puncture sealant of the present invention has excellent low-temperature injection properties, sealing performance, and storage performance due to the propylene glycol (PG)/water ratio (PG/water ratio, mass ratio) being from 0.5 to 1.1 and the viscosity at −20° C. when a BL-type viscometer is used being from 100 to 1200 mPa·s at a revolution speed of 60 rpm.

The natural rubber latex that can be included in the tire puncture sealant of the present invention is not particularly limited. Examples thereof include conventionally known substances. A deproteinized natural rubber latex formed by removing proteins from a natural rubber latex is preferably used as the natural rubber latex. If a protein content of the natural rubber latex is low, it is possible to reduce an amount of ammonia produced, which is desirable from the perspectives of preventing corrosion damage of steel cords by ammonia and preventing the generation of irritating odors. Specific examples of natural rubber latex include Deproteinized Natural Rubber Latex (SeLatex series, manufactured by SRI Hybrid Ltd.), Deproteinized Natural Rubber Latex (HA, manufactured by Nomura Trading Co., Ltd.), and Ultra-low Ammonia Natural Rubber Latex (ULACOL, manufactured by Regitex Co., Ltd.).

The natural rubber latex can be used alone or as a combination of two or more types of natural rubber latex.

The tire puncture sealant of the present invention may further contain a synthetic rubber latex in addition to a natural rubber latex. Examples of synthetic rubber latex include SBR latex, NBR latex, carboxy-modified NBR latex, and carboxy-modified SBR latex.

The synthetic resin emulsions that can be contained in the tire puncture sealant of the present invention are not particularly limited. Examples thereof include urethane emulsions, (meth)acrylic resin emulsions, polyolefin-based emulsions, ethylene-vinyl acetate copolymer resin emulsions, and ethylene-vinyl acetate-vinyl versatate copolymer resin emulsions. Of these, from the perspective of the synthetic resin contained in the synthetic resin emulsion having superior sealing performance and excellent storage performance, it is preferable to contain at least one type selected from the group consisting of ethylene-vinyl acetate copolymer resins, (meth)acrylic resins, and ethylene-vinyl acetate-vinyl versatate copolymer resins, and it is even more preferable to contain ethylene-vinyl acetate-vinyl versatate copolymer resins.

The synthetic resin emulsion can be used alone or as a combination of two or more types of synthetic resin emulsions. A synthetic resin emulsion containing two or more types of synthetic resins can be obtained, for example, by mixing two or more types of synthetic resin emulsions. When the synthetic resin is a copolymer, the copolymer may be, for example, a random copolymer, a block copolymer, or a graft copolymer.

The ethylene-vinyl acetate copolymer resin contained in the synthetic resin emulsion is not particularly limited as long as the copolymer resin contains ethylene and vinyl acetate as monomer units. Examples of ethylene-vinyl acetate copolymer resins include ethylene-vinyl acetate binary copolymer resins (EVA), ethylene-vinyl acetate-vinyl versatate copolymer resins (VEVA), and ethylene-vinyl acetate-acrylic acid ester copolymer resins.

The monomer ratio of monomers (ethylene:vinyl acetate, mass ratio) constituting EVA (binary copolymer) is preferably from 20:80 to 40:60 from the perspective of ensuring excellent storage performance.

The monomer ratio of monomers (ethylene:vinyl acetate: vinyl versatate, mass ratio) constituting VEVA is preferably from 5:5:90 to 10:5:85 from the perspective of ensuring excellent sealing performance and storage performance.

Specific examples of ethylene-vinyl acetate copolymer resin emulsions include Sumikaflex 408HQE, 401HQ, and 400HQ (all manufactured by Sumika Chemtex Co., Ltd.).

Specific examples of ethylene-vinyl acetate-vinyl versatate-based VA emulsions include Sumikaflex 950HQ and 951HQ (both manufactured by Sumika Chemtex Co., Ltd.).

The solid content of the natural rubber latex and/or the synthetic resin emulsion (mass %; when a natural rubber latex and a synthetic resin emulsion are used in combination, this is the total amount of the natural rubber and the synthetic resin) is preferably from 20 to 40% and even more preferably from 25 to 35% of the tire puncture sealant from the perspective of ensuring excellent low-temperature injection properties and sealing performance and achieving both sealing performance and storage performance.

From the perspective of ensuring excellent low-temperature injection properties and sealing performance and achieving both sealing performance and storage performance, the viscosity of the tire puncture sealant at −20° C. is at least 100 mPa·s and less than 400 mPa·s, and the solid content of the natural rubber latex and/or the synthetic resin emulsion (mass %) is preferably from 25 to 35%.

In the present invention, the solid content of the natural rubber latex and/or the synthetic resin emulsion is the nonvolatile content of the tire puncture sealant. The nonvolatile content is the natural rubber and/or the synthetic resin. The solid content of the natural rubber latex and/or the synthetic resin emulsion is the proportion (mass %) of the amount of a residue obtained out of the entire amount of the tire puncture sealant after heating the tire puncture sealant for one hour at 200° C.

The tire puncture sealant of the present invention preferably contains a natural rubber latex and a synthetic resin emulsion from the perspective of ensuring excellent storage performance. When the tire puncture sealant contains a natural rubber latex and a synthetic resin emulsion, the ratio (mass ratio) of the solid content of the natural rubber latex to the solid content of the synthetic resin emulsion is preferably from 90/10 to 30/70 and even more preferably from 70/30 to 50/50 from the perspective of ensuring low viscosity at −20° C., in particular, and achieving both excellent low-temperature injection properties and sealing performance.

In the present invention, the total amount of PG and water is preferably from 60 to 80 mass % and even more preferably from 65 to 75 mass % out of the entire amount of the tire puncture sealant from the perspective of ensuring superior low-temperature injection properties and sealing performance as well as excellent storage performance while maintaining the viscosity and solid content ratio within appropriate ranges at −20° C.

The tire puncture sealant of the present invention contains propylene glycol as an antifreezing agent. In the present invention, propylene glycol not only functions as an antifreezing agent, but it also yields a tire puncture sealant with excellent low-temperature injection properties and sealing performance due to a mass ratio to water (propylene glycol/water ratio) from 0.5 to 1.1. When the propylene glycol/water ratio is less than 0.5, the tire puncture sealant freezes. When the propylene glycol/water ratio is greater than 1.1, the viscosity of the tire puncture sealant increases, making it difficult to inject.

The propylene glycol/water ratio is preferably from 0.5 to 0.8 and even more preferably from 0.6 to 0.8 from the perspective of ensuring superior low-temperature injection properties and sealing performance as well as excellent storage performance.

In addition, a sealant in which the propylene glycol/water ratio is from 0.5 to 0.8 and the viscosity of the tire puncture sealant at −20° C. is at least 100 mPa·s and less than 400 mPa·s is preferable in that the low-temperature characteristics improve further.

The tire puncture sealant of the present invention may further contain additives that may be added as desired other than the respective components described above as necessary. Examples of the additives include tackifiers, fillers, antiaging agents, antioxidants, pigments (dyes), plasticizers, thixotropic agents, UV absorbents, flame retardants, surfactants (including leveling agents), dispersants, dewatering agents, and antistatic agents. The amounts of the additives are not particularly limited.

The method of producing the tire puncture sealant of the present invention is not particularly limited. An example of a method thereof is a method of producing a tire puncture sealant by sufficiently mixing a natural rubber latex and/or a synthetic resin emulsion, propylene glycol, and additives that may be added as desired at reduced pressure using a stirrer such as a combination mixer.

The viscosity of the tire puncture sealant of the present invention at −20° C. is from 100 to 1200 mPa·s under conditions at a revolution speed of 60 rpm when measured using a BL-type viscometer (rotor No. 3). When the viscosity is within such a range, the tire puncture sealant of the present invention has excellent low-temperature injection properties, sealing performance, and storage performance. The viscosity of the tire puncture sealant of the present invention is preferably not less than 100 mPa·s and not more than 400 mPa·s and even more preferably is at least 200 mPa·s and less than 400 mPa·s from the perspective of ensuring superior low-temperature injection properties and sealing performance as well as excellent storage performance.

As a method of using the tire puncture sealant of the present invention, for example, the tire puncture sealant of the present invention is first injected into a tire from an air-filling part of the tire. The method for injecting the tire puncture sealant of the present invention into the tire is not particularly limited, and it is possible to use a conventionally known method, for example, a method involving use of a syringe or a spray. An amount of the tire puncture sealant injected into the tire is not particularly limited, and is selected as appropriate depending on, for example, the size of the puncture hole. Next, the tire is filled with air until a predetermined air pressure is reached. The vehicle is then driven. Aggregates of natural rubber and/or synthetic resin particles or the like are formed by compressive forces and shear forces exerted when the tire rotates and comes into contact with the ground, thereby enabling sealing of the puncture hole.

EXAMPLES

The present invention is described below in detail using working examples but the present invention is not limited to such working examples.

<Evaluation>

The following evaluations were performed for the tire puncture sealants obtained as described below. The results are shown in the tables below.

Viscosity

The viscosity of the tire puncture sealant was measured under conditions at −20° C. and at a revolution speed of 60 rpm using a BL-type viscometer (rotor No. 3).

Sealing Performance

Drum tests were performed by reproducing a puncture hole with a size of 4 mm in diameter in the shoulder of the tire. The tire puncture sealant was injected from the valve opening of the tire having the reproduced puncture hole, as described above, and the tire was filled with air until the internal pressure of the tire reached 200 kPa. In drum tests, one cycle consists of traveling for one minute with a load of 350 kg at a travel speed of 30 km/h. The drum tests were performed under conditions at 25° C. (normal temperature).

Under the evaluation criteria for sealing performance, cases in which a seal could be established in 10 cycles or less were designated as "⊚"; cases in which a seal could be established in from 11 to 15 cycles were designated as "o"; cases in which a seal could be established in 16 or more cycles were designated as "Δ"; and cases in which a seal could not be established were designated as "x".

Storage Performance

In an atmosphere at 80° C., tests were performed by subjecting the tire puncture sealants obtained as described above to vibration at 20 Hz with an amplitude of ±3 mm for 168 hours.

Under the evaluation criteria for storage performance, cases in which the sealant was stable with no cream generation were designated as "⊚"; cases in which cream was generated but the cream disappeared and the sealant became uniform as a result of stirring the tire puncture sealant were designated as "o"; and cases in which aggregates were generated were designated as "x".

Low-Temperature Injection Properties

Cases in which the viscosity of the tire puncture sealant at −20° C. was at least 100 mPa·s and less than 400 mPa·s were designated as "⊚"; cases in which the viscosity was from 400 to 1200 mPa·s were designated as "o"; cases in which the viscosity was greater than 1200 mPa·s and less than 2000 mPa·s were designated as "Δ"; and cases in which the viscosity was at least 2000 mPa·s or could not be measured were designated as "x".

<Tire Puncture Sealant Production>

Tire puncture sealants were produced by mixing the components shown in each of the tables in the amounts (parts by mass) shown in the tables. Water was added as necessary when producing the tire puncture sealants. The amount of water in the mixture compositions in each table is the total amount of water contained in the total amount of the tire puncture sealant.

TABLE 1

Fixed NR100 solid content

| | | | Comparative Example | Working Examples | | | | Comparative Examples | |
|---|---|---|---|---|---|---|---|---|---|
| | | | 1 | 1 | 2 | 3 | 4 | 2 | 3 |
| Mixture composition | Rubber latex | NR | 166 (100) | 166 (100) | 166 (100) | 166 (100) | 166 (100) | 166 (100) | 166 (100) |
| | Synthetic resin Em | EVA | — | — | — | — | — | — | — |
| | | Acryl | — | — | — | — | — | — | — |
| | | VEVA | — | — | — | — | — | — | — |
| | Propylene glycol | | 52 | 60.5 | 80.8 | 86.4 | 94.6 | 99.6 | 109.5 |
| | Water | | 130 | 121 | 101 | 96 | 86 | 83 | 73 |
| Physical properties | Propylene glycol/water | | 0.4 | 0.5 | 0.8 | 0.9 | 1.1 | 1.2 | 1.5 |
| | Solid content % | | 35 | 35 | 35 | 35 | 35 | 35 | 35 |
| | Viscosity (−20° C.) mPa·s | | Frozen | 100 | 210 | 315 | 450 | 1250 | 2000 |
| Performance | Sealing performance | | Δ | o | o | o | o | ⊚ | ⊚ |
| | Storage performance | | o | o | o | o | o | X | X |
| | Low-temperature injection properties | | X | ⊚ | ⊚ | ⊚ | o | Δ | X |

TABLE 2

Fixed NR100PG/water ratio

| | | | Comparative Example | Working Examples | | | | Comparative Example |
|---|---|---|---|---|---|---|---|---|
| | | | 4 | 5 | 6 | 7 | | 5 |
| Mixture composition | Rubber latex | NR | 166 (100) | 166 (100) | 166 (100) | 166 (100) | | 166 (100) |
| | Synthetic resin Em | EVA | — | — | — | — | | — |
| | | Acryl | — | — | — | — | | — |
| | | VEVA | — | — | — | — | | — |
| | Propylene glycol | | 220 | 176 | 96 | 68 | | 56 |
| | Water | | 275 | 220 | 120 | 85 | | 70 |
| Physical properties | Propylene glycol/water | | 0.8 | 0.8 | 0.8 | 0.8 | | 0.8 |
| | Solid content % | | 15 | 20 | 30 | 40 | | 45 |
| | Viscosity (−20° C.) mPa·s | | 80 | 100 | 210 | 330 | | 1250 |
| Performance | Sealing performance | | Δ | o | o | ⊚ | | ⊚ |
| | Storage performance | | o | o | o | o | | X |

TABLE 2-continued

Fixed NR100PG/water ratio

| | Comparative Example | Working Examples | | | | Comparative Example |
|---|---|---|---|---|---|---|
| | 4 | 5 | 6 | 7 | | 5 |
| Low-temperature injection properties | ◎ | ◎ | ◎ | ◎ | | Δ |

TABLE 3

Fixed solid content

| | | | Comparative Example | Working Examples | | | | Comparative Examples | |
|---|---|---|---|---|---|---|---|---|---|
| | | | 6 | 8 | 9 | 10 | 11 | 7 | 8 |
| Mixture composition | Rubber latex | NR | 116 (70) | 116 (70) | 116 (70) | 116 (70) | 116 (70) | 116 (70) | 116 (70) |
| | Synthetic resin Em | EVA | 58 (30) | 58 (30) | 58 (30) | 58 (30) | 58 (30) | 58 (30) | 58 (30) |
| | | Acryl | — | — | — | — | — | — | — |
| | | VEVA | — | — | — | — | — | — | — |
| | Propylene glycol | | 44 | 51 | 68.8 | 72.9 | 81.4 | 162 | 180 |
| | Water | | 110 | 102 | 86 | 81 | 74 | 135 | 120 |
| Physical properties | Propylene glycol/water | | 0.4 | 0.5 | 0.8 | 0.9 | 1.1 | 1.2 | 1.5 |
| | Solid content % | | 25 | 25 | 25 | 25 | 25 | 25 | 25 |
| | Viscosity (−20° C.) mPa·s | | Frozen | 200 | 250 | 330 | 500 | 1500 | 3100 |
| Performance | Sealing performance | | Δ | ○ | ○ | ○ | ○ | ○ | ◎ |
| | Storage performance | | ◎ | ◎ | ◎ | ◎ | ◎ | ◎ | X |
| | Low-temperature injection properties | | X | ◎ | ◎ | ◎ | ○ | Δ | X |

TABLE 4

Ethylene glycol specification

| | | | Comparative Examples | | |
|---|---|---|---|---|---|
| | | | 9 | 10 | 11 |
| Mixture composition | Rubber latex | NR | 116 (70) | 116 (70) | 116 (70) |
| | Synthetic resin Em | EVA | 58 (30) | 58 (30) | 58 (30) |
| | | Acryl | — | — | — |
| | | VEVA | — | — | — |
| | Ethylene glycol | | 51 | 68.8 | 81.4 |
| | Water | | 102 | 86 | 74 |
| Physical properties | Ethylene glycol/water | | 0.5 | 0.8 | 1.1 |
| | Solid content % | | 25 | 25 | 25 |
| | Viscosity (−20° C.) mPa·s | | 40 | 65 | 80 |
| Performance | Sealing performance | | Δ | Δ | Δ |
| | Storage performance | | ◎ | ◎ | ◎ |
| | Low-temperature injection properties | | ◎ | ◎ | ◎ |

TABLE 5

Fixed PG/water ratio

| | | | Working Example | Comparative Example | Working Examples | | | Comparative Example |
|---|---|---|---|---|---|---|---|---|
| | | | 12 | 12 | 13 | 14 | 15 | 13 |
| Mixture composition | Rubber latex | NR | 149 (90) | 116 (70) | 116 (70) | 116 (70) | 116 (70) | 116 (70) |
| | Synthetic resin Em | EVA | 19 (10) | 58 (30) | 58 (30) | 58 (30) | 58 (30) | 58 (30) |
| | | Acryl | — | — | — | — | — | — |
| | | VEVA | — | — | — | — | — | — |
| | Propylene glycol | | 80 | 220 | 144 | 104 | 68 | 58.4 |
| | Water | | 100 | 275 | 180 | 130 | 85 | 73 |
| Physical properties | Propylene glycol/water | | 0.8 | 0.8 | 0.8 | 0.8 | 0.8 | 0.8 |
| | Solid content % | | 35 | 15 | 20 | 30 | 40 | 45 |

TABLE 5-continued

| | | Fixed PG/water ratio | | | | | |
|---|---|---|---|---|---|---|---|
| Performance | Viscosity (−20° C.) mPa·s | 340 | 95 | 135 | 260 | 850 | 1350 |
| | Sealing performance | ○ | Δ | ○ | ○ | ◎ | ◎ |
| | Storage performance | ◎ | ◎ | ◎ | ◎ | ◎ | X |
| | Low-temperature injection properties | ◎ | ◎ | ◎ | ◎ | ○ | Δ |

| | | | Working Examples | | Comparative Examples | | Working Examples | |
|---|---|---|---|---|---|---|---|---|
| | | | 16 | 17 | 14 | 15 | 18 | 19 |
| Mixture composition | Rubber latex | NR | 83 (50) | 50 (30) | 33 (20) | — | 116 (70) | 116 (70) |
| | Synthetic resin Em | EVA | 96 (50) | 134 (70) | 154 (80) | 193 (100) | — | — |
| | | Acryl | — | — | — | — | 60 (30) | — |
| | | VEVA | — | — | — | — | — | 56 (30) |
| | Propylene glycol | | 112 | 128 | 104 | 108 | 60.8 | 57.6 |
| | Water | | 140 | 160 | 130 | 135 | 76 | 72 |
| Physical properties | Propylene glycol/water | | 0.8 | 0.8 | 0.8 | 0.8 | 0.8 | 0.8 |
| | Solid content % | | 28 | 25 | 30 | 30 | 30 | 30 |
| | Viscosity (−20° C.) mPa·s | | 300 | 380 | 1400 | 1500 | 600 | 380 |
| Performance | Sealing performance | | ○ | ○ | Δ | Δ | ◎ | ◎ |
| | Storage performance | | ◎ | ◎ | ◎ | ◎ | ◎ | ◎ |
| | Low-temperature injection properties | | ◎ | ◎ | Δ | Δ | ○ | ◎ |

The details of each component shown in each table are as follows.

Rubber latex NR: natural rubber latex (HytexHA, manufactured by Nomura Trading Co., Ltd.; solid content: approximately 60 mass %)

Synthetic resin Em EVA: ethylene-vinyl acetate copolymer resin emulsion (Sumikaflex 408HQE, manufactured by Sumika Chemtex Co., Ltd.; ethylene:vinyl acetate=40:60; solid content=approximately 50 mass %)

Synthetic resin Em acryl: acrylic emulsion (Acronal A378, manufactured by BASF Ltd.; solid content: approximately 50 mass %)

Synthetic resin Em VEVA: ethylene-vinyl acetate-vinyl versatate copolymer resin emulsion (Sumikaflex 950HQ, manufactured by Sumika Chemtex Co., Ltd.; ethylene:vinyl acetate:vinyl versatate=10:5:85; solid content=approximately 53 mass %)

Propylene glycol: grade 1 reagent, manufactured by Wako Pure Chemical Industries, Ltd.

Ethylene glycol: manufactured by Sankyo Chemical Industry Co., Ltd.

As is clear from the results shown in the tables, in Table 1 (NR latex solid content: 100 parts by mass; fluctuating PG/water ratio; fixed solid content), Comparative Example 1, in which the PG/water ratio was less than 0.5, froze at −20° C., demonstrating poor low-temperature injection properties and low sealing performance. In Comparative Examples 2 and 3, in which the PG/water ratio exceeded 1.1, the viscosity at −20° C. exceeded 1200 mPa·s, and the low-temperature injection properties and storage performance were low. In contrast, Working Examples 1 to 4 demonstrated excellent low-temperature injection properties, sealing performance, and storage performance. In a comparison of Working Example 4 and Comparative Example 2, the viscosity increased dramatically in Comparative Example 2 (PG/water ratio: 1.2).

In Table 2 (NR latex solid content: 100 parts by mass; fixed PG/water ratio; fluctuating solid content), Comparative Example 4, in which the viscosity at −20° C. was less than 100 mPa·s, demonstrated low sealing performance. In Comparative Example 5, in which the viscosity at −20° C. exceeded 1200 mPa·s, the low-temperature injection properties and storage performance were low. In contrast, Working Examples 5 to 7 demonstrated excellent low-temperature injection properties, sealing performance, and storage performance. From the results of Working Examples 5 to 7, the viscosity at −20° C. can be set to 100 to 1200 mPa·s by setting the solid content of the natural rubber and/or the synthetic resin emulsion to 20 to 40%.

In Table 3 (NR latex and synthetic resin emulsion solid content: 100 parts by mass; fluctuating PG/water ratio; fixed solid content), Comparative Example 6, in which the PG/water ratio was less than 0.5, froze at −20° C., demonstrating poor low-temperature injection properties and low sealing performance. In Comparative Examples 7 and 8, in which the PG/water ratio exceeded 1.1, the viscosity at −20° C. exceeded 1200 mPa·s, and the low-temperature injection properties were low. In contrast, Working Examples 8 to 11 demonstrated excellent low-temperature injection properties, sealing performance, and storage performance. In a comparison of Working Example 11 and Comparative Example 7, the viscosity increased dramatically in Comparative Example 7 (PG/water ratio: 1.2).

In Table 4 (ethylene glycol specification), Comparative Examples 9 to 11, in which ethylene glycol was used instead of PG, demonstrated low sealing performance.

In a comparison of Comparative Examples 12 and 13 and Working Examples 13 to 15, 18, and 19 in Table 5 (NR latex and synthetic resin emulsion or synthetic resin emulsion solid content: 100 parts by mass; fixed PG/water ratio; fluctuating solid content), Comparative Example 12, in which the viscosity at −20° C. was less than 100 mPa·s, demonstrated low sealing performance. In Comparative Example 13, in which the viscosity at −20° C. exceeded 1200 mPa·s, the low-temperature injection properties and storage performance were low. In contrast, Working Examples 13 to 15, 18, and 19 demonstrated excellent low-temperature injection properties, sealing performance, and storage performance. From the results of Working Examples 13 to 15, the viscosity at −20° C. can be set to 100 to 1200 mPa·s by setting the solid content of the natural rubber and/or the synthetic resin emulsion to 20 to 40%.

In a comparison of Working Examples 2 and 12 to 17 and Comparative Examples 14 and 15, Comparative Examples 14 and 15, in which the viscosity at −20° C. exceeded 1200 mPa·s, demonstrated poor low-temperature injection properties and sealing performance. In contrast, Working Examples 2 and 12 to 17 demonstrated excellent low-temperature injection properties, sealing performance, and storage performance.

The tire puncture sealant of the present invention can achieve both excellent low-temperature injection properties and sealing performance and also has excellent storage performance.

What is claimed is:

1. A tire puncture sealant comprising a natural rubber latex, a synthetic resin emulsion, and propylene glycol, a propylene glycol/water ratio being from 0.5 to 1.1, a viscosity at −20° C. when a Type B Brookfield viscometer is used being from 100 to 1200 mPa·s at a revolution speed of 60 rpm, a total solid content of the natural rubber latex and the synthetic resin emulsion being from 25 to 35% of the tire puncture sealant, a synthetic resin contained in the synthetic resin emulsion containing at least one type selected from the group consisting of ethylene-vinyl acetate copolymer resins and ethylene-vinyl acetate-vinyl versatate copolymer resins, and a ratio of the solid content of the natural rubber latex to the solid content of the synthetic resin emulsion is from 90/10 to 30/70.

2. The tire puncture sealant according to claim 1, wherein the viscosity of the tire puncture sealant at −20° C. is not less than 100 mPa·s and not more than 400 mPa·s.

3. The tire puncture sealant according to claim 1, wherein the viscosity of the tire puncture sealant at −20° C. is at least 100 mPa·s and less than 400 mPa·s.

4. The tire puncture sealant according to claim 1, wherein the total amount of propylene glycol and water is from 60 to 80 mass % of the entire amount of the tire puncture sealant.

5. The tire puncture sealant according to claim 1, wherein the total amount of propylene glycol and water is from 65 to 75 mass % of the entire amount of the tire puncture sealant.

6. The tire puncture sealant according to claim 1, wherein the viscosity of the tire puncture sealant at −20° C. is not less than 100 mPa·s and not more than 400 mPa·s, the total amount of propylene glycol and water is from 60 to 80 mass % of the entire amount of the tire puncture sealant.

7. A tire puncture sealant comprising a natural rubber latex, a synthetic resin emulsion, and propylene glycol, a propylene glycol/water ratio being from 0.5 to 0.8 , a viscosity of the tire puncture sealant at −20° C. when a Type B Brookfield viscometer is used being at least 100 mPa·s and less than 400 mPa ·s at a revolution speed of 60 rpm, a total solid content of the natural rubber latex and the synthetic resin emulsion being from 25 to 35% of the tire puncture sealant, a synthetic resin contained in the synthetic resin emulsion containing at least one type selected from the group consisting of ethylene-vinyl acetate copolymer resins and ethylene-vinyl acetate-vinyl versatate copolymer resins, and a ratio of the solid content of the natural rubber latex to the solid content of the synthetic resin emulsion is from 90/10 to 30/70.

* * * * *